United States Patent
Jacquin et al.

(10) Patent No.: US 11,757,717 B2
(45) Date of Patent: Sep. 12, 2023

(54) VERIFYING NETWORK ELEMENTS

(71) Applicant: HEWLETT PACKARD ENTERPRISE DEVELOPMENT LP, Houston, TX (US)

(72) Inventors: Ludovic Emmanuel Paul Noel Jacquin, Bristol (GB); Adrian Shaw, Bristol (GB); Chris I. Dalton, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 551 days.

(21) Appl. No.: 15/500,918

(22) PCT Filed: Nov. 28, 2014

(86) PCT No.: PCT/US2014/067818
§ 371 (c)(1),
(2) Date: Jan. 31, 2017

(87) PCT Pub. No.: WO2016/085517
PCT Pub. Date: Jun. 2, 2016

(65) Prior Publication Data
US 2017/0230245 A1    Aug. 10, 2017

(51) Int. Cl.
*H04L 41/0866* (2022.01)
*H04L 41/0893* (2022.01)
(Continued)

(52) U.S. Cl.
CPC ...... *H04L 41/0866* (2013.01); *H04L 41/0893* (2013.01); *H04L 41/12* (2013.01); *H04L 41/28* (2013.01)

(58) Field of Classification Search
CPC . H04L 41/0866; H04L 41/0893; H04L 41/12; H04L 41/28
See application file for complete search history.

(56) References Cited

U.S. PATENT DOCUMENTS

| 7,574,600 B2 | 8/2009 | Smith |
| 7,882,221 B2 | 2/2011 | Sailer et al. |

(Continued)

FOREIGN PATENT DOCUMENTS

| CN | 103226675 A | 7/2013 |
| CN | 104049972 A | 9/2014 |

(Continued)

OTHER PUBLICATIONS

Intel Corporation, "Building Trust and Compliance in the Cloud with Intel Trusted Execution Technology," White Paper, 2013, pp. 1-18.

(Continued)

*Primary Examiner* — Suraj M Joshi
*Assistant Examiner* — Ayele F Woldemariam
(74) *Attorney, Agent, or Firm* — Trop, Pruner & Hu, P.C.

(57) ABSTRACT

Examples relate to verifying network elements. In one example, a computing device may: receive, from a client device, a request for attestation of a back-end network, the request including back-end configuration requirements; obtain, from a network controller that controls the back-end network, a controller configuration that specifies each network element included in the back-end network; provide each network element included in the back-end network with a request for attestation of a network element configuration of the network element; receive, from each network element, response data that specifies the network element configuration of the network element; verify that the response data received from each network element meets the back-end configuration requirements included in the request for attestation of the back-end network; and provide the client device with data verifying that the back-end network meets the back-end configuration requirements.

20 Claims, 3 Drawing Sheets

(51) Int. Cl.
*H04L 41/28* (2022.01)
*H04L 41/12* (2022.01)

(56) References Cited

U.S. PATENT DOCUMENTS

| | | | | |
|---|---|---|---|---|
| 8,176,336 | B1* | 5/2012 | Mao | H04L 9/006 |
| | | | | 713/189 |
| 8,248,958 | B1* | 8/2012 | Tulasi | H04L 43/50 |
| | | | | 370/241 |
| 8,544,092 | B2 | 9/2013 | Hermann et al. | |
| 8,667,263 | B2 | 3/2014 | Challener et al. | |
| 9,654,465 | B2 | 5/2017 | Balmakhtar et al. | |
| 9,769,186 | B2 | 9/2017 | Teddy et al. | |
| 9,787,572 | B2 | 10/2017 | Voit et al. | |
| 2003/0145069 | A1 | 7/2003 | Lau et al. | |
| 2005/0265356 | A1* | 12/2005 | Kawarai | H04L 12/4641 |
| | | | | 370/395.53 |
| 2006/0026419 | A1 | 2/2006 | Arndt et al. | |
| 2008/0040478 | A1 | 2/2008 | Bogner | |
| 2008/0141024 | A1 | 6/2008 | Ranganathan | |
| 2008/0181136 | A1 | 7/2008 | Watanabe et al. | |
| 2008/0229097 | A1* | 9/2008 | Bangerter | H04L 9/3218 |
| | | | | 713/155 |
| 2008/0235372 | A1* | 9/2008 | Sailer | G06F 21/577 |
| | | | | 709/224 |
| 2009/0178138 | A1 | 7/2009 | Weiss et al. | |
| 2009/0204964 | A1 | 8/2009 | Foley et al. | |
| 2012/0023568 | A1 | 1/2012 | Cha et al. | |
| 2012/0266231 | A1* | 10/2012 | Spiers | H04L 63/0218 |
| | | | | 726/12 |
| 2013/0298242 | A1 | 11/2013 | Kumar et al. | |
| 2013/0304903 | A1* | 11/2013 | Mick | H04L 67/10 |
| | | | | 709/224 |
| 2014/0013451 | A1* | 1/2014 | Kulka | G06F 21/14 |
| | | | | 726/29 |
| 2014/0075519 | A1 | 3/2014 | Porras et al. | |
| 2014/0177634 | A1 | 6/2014 | Jiang et al. | |
| 2014/0189811 | A1 | 7/2014 | Taylor et al. | |
| 2014/0331309 | A1 | 11/2014 | Spiers et al. | |
| 2014/0337277 | A1* | 11/2014 | Asenjo | G06Q 10/06 |
| | | | | 707/603 |
| 2015/0089566 | A1 | 3/2015 | Chesla | |
| 2015/0365193 | A1 | 12/2015 | Connolly et al. | |
| 2016/0191466 | A1 | 6/2016 | Pernicha | |

FOREIGN PATENT DOCUMENTS

| | | |
|---|---|---|
| EP | 2779564 A1 | 9/2014 |
| WO | 2013/097901 A1 | 7/2013 |
| WO | 2013/104375 A1 | 7/2013 |

OTHER PUBLICATIONS

Intel Corporation, "Implementing SDN and NFV with Intel Architecture," White Paper, 2013, pp. 1-8.

International Search Report and Written Opinion, International Application No. PCT/US2014/067818, dated Aug. 20, 2015, pp. 1-12, KIPO.

J. Christopher Bare, "Attestation and Trusted Computing," Mar. 2006, pp. 1-10, CSEP 590: Practical Aspects of Modern Cryptography.

Liqun Chen et al., "A Protocol for Property-Based Attestation," STC'06, Nov. 2006, pp. 1-10, ACM.

Openstack, "Trusted Compute Pools," 2013, pp. 1-2, Available at: <docs.openstack.org/admin-guide-cloud/content/trusted-compute-pools.html>.

Robert Soule et al., "Merlin: A Language for Provisioning Network Resources," 2014, pp. 1-12.

Song Cheng et al., "A Security-Enhanced Remote Platform Integrity Attestation Scheme," Sep. 2009, pp. 1-4, IEEE.

Surya Nepal et al., "Trust Extension Device: Providing Mobility and Portability of Trust in Cooperative Information Systems," 2007, pp. 253-271, Springer-Verlag Berlin Heidelberg.

Tamleek Ali et al., "Scalable, Privacy-preserving Remote Attestation in and Through Federated Identity Management Frameworks," Feb. 24, 2010, pp. 1-8, Available at: <csrdu.org/pub/nauman/pubs/tshib-icisa10.pdf>.

Xitao Wen, "NFV Attestation Survey," PowerPoint Presentation, Nov. 17, 2014, pp. 1-21.

Trusted Computing Group, Inc., "TPM Main, Part 1 Design Principles," Mar. 1, 2011, pp. 1-184, Specification Version 1.2, Revision 116, Available at <trustedcomputinggroup.org/wp-content/uploads/TPM-Main-Part-1-Design-Principles_v1.2_rev116_01032011.pdf>.

Tien Tuan Anh Dinh and Mark Dermot Ryan, "Trusted Computing: TCG Proposals," Nov. 4, 2006, pp. 1-9, Available at: <http://www.cs.bham.ac.uk/~mdr/teaching/modules/security/lectures/TrustedComputingTCG.html>.

International Search Report and Written Opinion, International Application No. PCT/US2014/067814, dated Aug. 20, 2015, pp. 1-10, KIPO.

Diego Kreutz et al., "Software-Defined Networking: A Comprehensive Survey," Jun. 2, 2014, pp. 1-49, Version 1.0, IEEE, Available at: <arxiv.org/abs/1406.0440>.

Aryan Taherimonfared, "Securing the IAAS Service Model of Cloud Computing Against Compromised Components," Jun. 20, 2011, pp. 1-186, NTNU, Available at: <diva-portal.org/smash/get/diva2:438670/FULLTEXT01.pdf>.

ARM Ltd., "ARM TrustZone," Retrieved from internet on May 11, 2017, pp. 1-4, Available at: <arm.com/products/processors/technologies/trustzone/index.php>.

* cited by examiner

VERIFYING NETWORK ELEMENTS

CROSS-REFERENCE TO RELATED APPLICATIONS

This application is related to application Ser. No. 15/500,919, titled "Verifying a Network Configuration," the entirety of which is incorporated by reference.

The work leading to this invention has received funding from the European Union Seventh Framework Programme under Grant Agreement No 611458.

BACKGROUND

Software defined networking allows for flexibility in the network configurations used to manage network communications between network elements that are included in a software defined network (SDN). An SDN controller that manages the network elements in an SDN is capable of dynamically reconfiguring the network configuration of individual network elements. While non-SDN networks implicitly trust network administrators to correctly manage network hardware, SDN network administrators generally manage the SDN controllers, leaving the management of the individual network elements to the SDN controllers.

BRIEF DESCRIPTION OF THE DRAWINGS

The following detailed description references the drawings, wherein.

DETAILED DESCRIPTION

Figure 1:
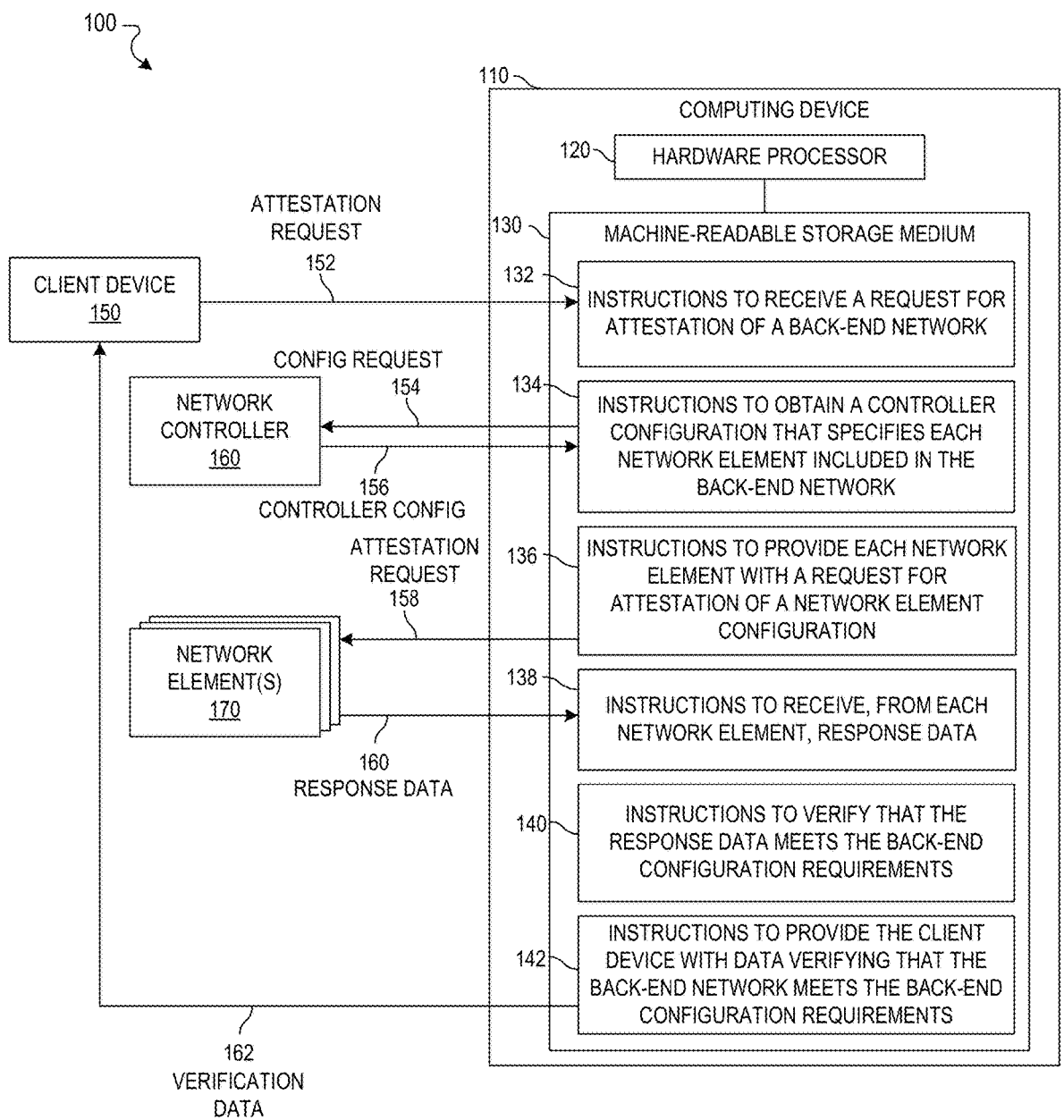
FIG. 1 is a block diagram of an example computing device for verifying network elements.

In a software defined network, one or more SDN controllers are configured to manage the network elements, e.g., routers, switches, and servers, which control the flow of network traffic throughout the SDN. While an administrator may configure SDN controllers, the configuration of the network elements is generally performed by the SDN controller. Without the implied trust conveyed to devices directly managed by an administrator, other methods are used to verify network configurations of network elements. The verification process for a single network element may expose sensitive network element configuration information to the device requesting verification. An intermediary device may be used to verify network elements on behalf of a device requesting verification, and do so in a manner designed to reduce exposure of the individual network elements' configuration information to the requesting device.

By way of example, an SDN may be used to manage cloud computing infrastructure. SDN controllers instruct the various network elements included in the SDN where they should route traffic and, in some implementations, dynamically change configurations. SDN controllers may change configurations, for example, as part of a load balancing routine, responsive to one or more network elements crashing, or responsive to clients requesting specific configurations of the network elements used. If, for example, a client would like to keep its SDN network traffic on dedicated network elements that are not in use by any other clients, an SDN controller may reconfigure a subset of network elements to specifically handle the client's work and to reject any traffic received, directly or indirectly, from or for another client.

While the SDN controller may store the current state of some or all the SDN, including individual network element configurations, a client may request that each network element attest to certain network element characteristics, so as not to rely on the SDN controller. An intermediary device, such as a trust engine running on a front-end server, may verify the individual network elements on behalf of the client, and attest to the network element configurations in a manner designed to ensure that sensitive network element configuration information is not provided to the client device, while still providing the client device with verification of the source and integrity of the network element configuration information.

Using the SDN cloud computing example, a client may communicate to the SDN through a front-end network element, such as a front-end server computer, which may be separate from the SDN controller. The client may provide the front-end server with the information necessary to perform its cloud computing work, and the front-end server may, in turn, communicate the needs of the client to the SDN controller. The SDN controller assigns network elements to handle the client's network traffic and process work on behalf of the client. The network elements handling the client's network traffic and work may be referred to as back-end network elements, which are generally separate from the network element(s) through which the client communicates with the SDN—the front-end network element(s).

The client may seek verification of various characteristics of the back-end network elements that are handling the client's traffic and performing work for the client. Example characteristics include both software measurements and network configurations. Software measurements may be used to verify the state of software applications running on a network element. Network configuration information may be used to verify the manner in which a network element handles various types of network traffic. A client may seek to verify, for example, that every network element that handles the client's network traffic, or a subset thereof, is running software supporting a particular version of Open-Flow protocol, and/or that the client's network traffic never leaves a certain country.

The client's request for verification, or attestation, of the back-end network may be received by the front-end network element. While the SDN configuration may allow for the client to verify each network element individually, doing so may expose potentially sensitive network element information, such as the exact versions of OpenFlow supported or the exact locations of network elements. The front-end network element may therefore verify the characteristics of the back-end network on behalf of the client, e.g., using a trust engine included in or in communication with the front-end server.

A trust engine receives the request for attestation of the back-end network from the client and obtains, from the SDN controller, controller configuration data that specifies, for example, each network element in the client's back-end network and the expected configuration of each of the network elements. The trust engine then obtains, from each network element in the back-end network, the information needed to provide attestation proof to the client. In some implementations, the trust engine obfuscates any sensitive network element information, e.g., by reducing the granularity of the network element characteristics, before providing the client with the attestation proof, or verification data, Individual network elements included in the SDN are capable of attesting to a current network configuration to a requesting verifier, such as the trust engine. Each network element may include a trusted component, described in further detail below, which facilitates delivery of secure and verifiable configuration data to the trust engine.

By way of example, a network element included in the SDN may receive, from the trust engine, a request for attestation of the current network configuration of the network element. The network element can identify the local stored networking configuration rules currently in use, e.g., the port forwarding rules used by the network element to handle network traffic of various types and from various sources. Data representing the networking configuration rules may be provided by the network element to a trusted component included in or in communication with the network element.

The trusted component provides the network element with response data that includes data representing each network configuration rule and a digital signature attesting the identity of the network element. The response data may be provided to the trust engine as attestation proof of the network configuration of the network element. Digitally signed response data may be used to verify the source and integrity of the response data, allowing the data to be trusted by recipients.

In the SDN cloud computing example, a client may be able to verify, through the trust engine, that the network configuration of each back-end network element ensures, among other things, network traffic isolation within the SDN cloud. Other example attestations include verifying, via software measurements and/or network configuration rules, a particular type of encryption used to transmit data; verifying that network traffic is limited to network elements operating in a single country, or that network traffic is excluded from one or more countries; verifying that particular versions of software are running on the network elements that handle a particular client's network traffic; or verifying that another client's network traffic, such as that of a client competitor, is isolated from the back-end network elements that handle the client's network traffic. Many other back-end network element properties, including back-end network configurations, may be attested to by network elements using the trust engine. Further details of attestation, including the operations of the trust engine and role of trusted components, are described in further detail below.

Referring now to the drawings, FIG. 1 is a block diagram 100 of an example computing device 110 for verifying network elements. Computing device 100 may be, for example, a network element, such as a server computer, a network switch, a network router, or any other electronic device suitable for use in an SDN. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-142, to control the process for verifying network elements. As an alternative or in addition to retrieving and executing instructions, hardware processor 120 may include one or more electronic circuits that include electronic components for performing the functionality of one or more instructions.

A machine-readable storage medium, such as 130, may be any electronic, magnetic, optical, or other physical storage device that contains or stores executable instructions. Thus, machine-readable storage medium 130 may be, for example, Random Access Memory (RAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with a series of executable instructions: 132-142, for verifying network elements 170.

As shown in FIG. 1, the computing device 110 receives, from client device 150, a request 152 for attestation of a back-end network (132). The request includes back-end configuration requirements. The back-end configuration requirements may include, for example, software measurement and/or network configuration requirements for network elements that comprise some or all of a back-end network portion of an SDN. The client device 150 may be any device in communication with the computing device 110, such as a personal computer, server computer, virtual computer, or a third-party verification device, to name a few.

The computing device 110 obtains, from a network controller 160 that controls the back-end network, a controller configuration 156 that specifies each network element included in the back-end network (134). For example, the computing device 110 may send a configuration request 154 to the network controller 160 requesting the configuration of each back-end network element for which attestation was requested. The controller configuration 156 provided in response to the request 154 may include, for example, information identifying, for each network element included in the back-end network, expected software measurement data and expected network configuration data for each network element.

The computing device 110 provides each network element 170 included in the back-end network with a request for attestation the network element configuration (136). An attestation request 158 sent to each network element 170 may include, for example, a request for software measurements and/or a current network configuration. While the example 100 depicts multiple network elements 170, in some implementations the back-end network may include only a single network element.

The computing device 110 receives, from each network element 170, response data 160 that specifies the network element configuration of the network element (138). Each response data 160 may include, for example, software measurements from the corresponding network element and the current network configuration of the corresponding network element. In some implementations, the response data 160 is digitally signed, e.g., by a trusted component included in each network element 170.

The computing device 110 verifies that the response data 160 received from each network element meets the back-end configuration requirements included in the request for attestation of the back-end network (140). For example, if the back-end configuration requirements specify that each back-end network element should be running at least version 2.0 of Software A, the computing device may verify that software measurements included in the response data 160 for each network element 170 indicate that each back-end network element is running Software A with a version number of at least 2.0. In some implementations, the computing device 110 may also verify, e.g., using a third party verifier, that Software A is "safe" by comparing specific software measurements to expected software values. For example, in situations where the response data 160 includes platform configuration register (PCR) values recorded by a trusted compute module (TCM) of a network element, a third party verifier can verify that the PCR values are known to be safe.

The computing device 110 provides the client device 150 with data 162 verifying that the back-end network meets the back-end configuration requirements (142). Using the example configuration requirement regarding Software A, the computing device 110 may send the client device 150 data indicating that each of the back-end network elements 170 has at least version 2.0 of Software A.

In some implementations, the computing device 110 may generate obfuscated response data based on the response data 160 received from each network element. Obfuscated response data may be generated by reducing granularity, or specificity, of software measurements and/or network configuration data. For example, the response data 160 received from the network elements 170 may indicate that some of the network elements 170 are running version 2.4 of Software A, while the network elements 170 which are not running version 2.4 are running version 2.5. Obfuscated response data may indicate that the network elements are all running at least version 2.2 of Software A. The obfuscation of the response data 160 protects the network elements 170 by not specifying the exact version numbers for the client device 150. In implementations where obfuscated data is generated, the obfuscated response data is the data 162 provided to the client device 150 to verify that the back-end network meets the back-end configuration requirements.

In some implementations, the client device 150 may also request and receive attestation from the computing device 110 to attest to the computing device 110 itself. Attestation of the computing device 110 to the client device 150 may be direct, rather than using an intermediary device, and is designed to ensure that the client device 150 that the computing device 110 meets configuration requirements that may be the same as, or different from, the configuration requirements for the back-end network. In implementations where the client device 150 requests attestation of the computing device 110, the computing device 110 includes instructions to receive the request for attestation. The computing device 110 also includes instructions to provide the computing device's attestation proof to the client device 150 in response to the request. Further details regarding the verification of network elements are provided in the example described with respect to FIG. 2, below.

Figure 2:
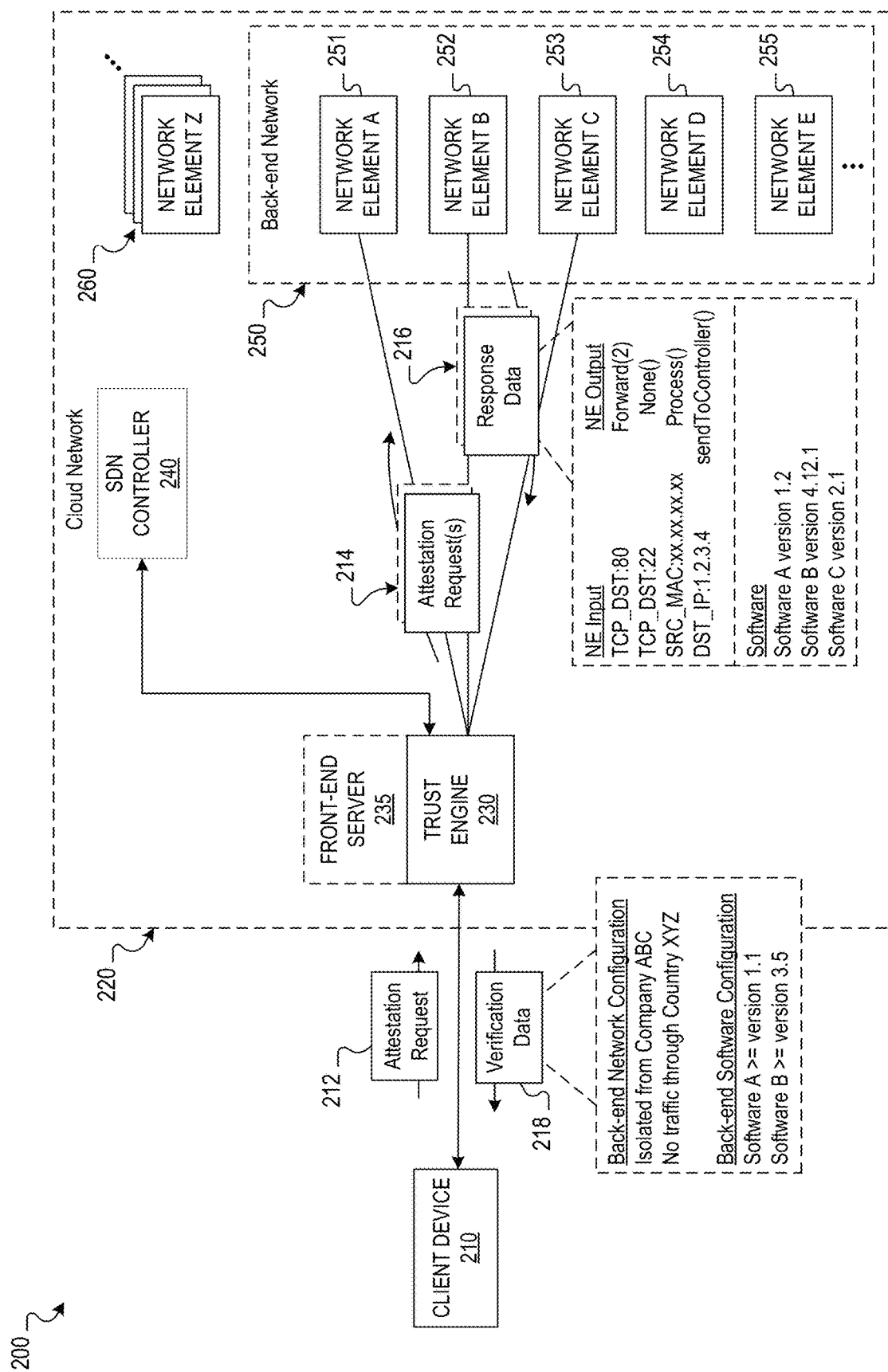
FIG. 2 is an example data flow for verifying network elements.

FIG. 2 is an example data flow 200 for verifying network elements. The data flow 200 depicts a client device 210 in communication with a cloud network 220, which, in the example data flow 200, is an SDN Network. The cloud network 220 includes a trust engine 230 that is included in a front-end server 235, a network controller 240, a back-end network 250 that includes network elements 251-255, and network elements 260 that are included in the cloud network 220, but not included in the back-end network 250.

While the trust engine 230 is depicted in the example data flow 220 as being included in the front-end server 235, in some implementations the trust engine 230 is a standalone device, e.g., a separate network element. The separation of the back-end network 250 from the remainder of the cloud network 220 may be logical, physical, or a combination thereof. The trust engine 230, or front-end server 235 including the trust engine 230, may be a computing device, such as the computing device described above with respect to FIG. 1.

The client device 210 sends an attestation request 212 to the trust engine 230. The attestation request 212 may be sent directly or indirectly to the trust engine, e.g., it may be sent to the front-end server 235, which provides the request to the trust engine 230. The attestation request 212 includes back-end network configuration requirements. For example, the back-end network configuration requirements may include a request for attestation of isolation of each network element included in the back-end network from network traffic of another client. E.g., a client operating the client device 210 may wish to ensure that the network elements included in the back-end network 250, which are performing the client's work, are not also handling any network communications from a particular competitor of the client.

Responsive to receiving the attestation request 212, the trust engine 230 obtains, from the SDN controller 240 that controls the back-end network 250, a back-end network topology that specifies each network element included in the back-end network 250 and the links between those network elements. For example, the back-end network topology provided to the trust engine 230 may specify that network communications and work for the client operating the client device 210 are handled on network elements 251-255. These network elements 251-255, e.g., that comprise the back-end network 250, are the network elements for which attestation proof is required in order to meet the back-end network configuration requirements included in the attestation request 212.

The trust engine 230 provides each network element included in the back-end network 250 with a request 214 for attestation of a network element configuration of the network element. For example, network elements A 251, B 252, C 253, D 254, and E 255 are each provided with an attestation request 214 that may include a request for a network configuration, e.g., the port forwarding rules, of the respective network element.

The trust engine 230 receives, from each network element included in the back-end network 250, response data 216 that specifies the network element configuration of the network element. The network element configuration includes data specifying links between the corresponding network element and other network elements. The response data 216 may include, for example, the port forwarding rules of each respective network element and/or software measurements specifying information about the software of each respective network element.

After receiving response data 216, the trust engine 230 verifies that the response data 216 meets the back-end network configuration requirements included in the request for attestation of the back-end network 250. This may include, for example, verifying isolation of network traffic from another client and/or verifying geographic locations of network elements satisfy client requirements. Verification of some back-end network requirements, such as isolation from a second client's traffic, may include obtaining the second client's network configuration from the SDN controller 240 in order to verify that network communications through the back-end networks of the clients are isolated. In some implementations, the trust engine 230 verifies software requirements, such as software version numbers, software compatibility, and software security.

The trust engine 230 provides the client device 210 with data 218 verifying that the back-end network 250 meets the back-end network configuration requirements. For example, the verification data 218 specifies that the client's network traffic is isolated from Company ABC, e.g., a competitor for which attestation of isolation was requested.

As with the computing device of FIG. 1, the trust engine 230 may, in some implementations, obfuscate response data before providing it to the client device 210. In the example data flow 200, the response data 216 shows example port forwarding rules and software version numbers for a network element included in the back-end network 250. Instead of providing the client device 210 with the port forwarding rules and exact software and version numbers, which may contain sensitive information, the trust engine 230 creates obfuscated response data 218 shown in the example data flow. The example obfuscated response data 218 specifies that i) the back-end network is isolated from network traffic of Company ABC, without providing the client the particular port forwarding rules to prove isolation, ii) none of the network traffic between the network elements of the back-end network 250 go through Country XYZ, without providing specific locations for each network element, and iii) Software A and Software B running on network elements of the back-end network is are up-to-date as of at least a particular version number, without providing the exact version numbers or additional software applications running on the network elements.

In addition to providing the client device 210 with the network configuration and software of the back-end network, the verification data 218 may also provide proof that the data 218 has not been manipulated by a third party, and that it is in a known safe state. In an SDN, a trusted component included in or communicably coupled to each network element, including the trust engine 230, may be used to dynamically and remotely facilitate verification of network elements.

A trusted component is a hardware device that is capable of attesting to the identity of a network element. In some implementations, the trusted component is a Trusted Platform Module (TPM), e.g., as specified by the Trusted Computing Group. A TPM is a dedicated hardware processor designed to secure hardware and attest to software using cryptographic techniques. A TPM may, for example, monitor the behavior of a network element during boot, and store values related to the software, including firmware, in Platform Configuration Registers (PCRs). The PCR values specify the condition of software running on the network element monitored by the TPM. The TPM may cryptographically bind one or more of the PCR values using a unique key, allowing another party, such as the trust engine 230 or client device 210, to verify both the identity and software of the network element. While a TPM is one example of a trusted component, other devices that provide verification of the identity of the network element may be used as the trusted component. As used herein, software and firmware both include machine readable instructions.

For example, a trusted component included in each network element of the back-end network 250 may generate digitally signed response data 216 that includes data representing network configuration rules, software measurements, and a digital signature. A trusted component may obtain a key uniquely identifying the corresponding network element and use that key to digitally sign the response data 216. For example, if network configuration rules and software measurements included strings of letters and numbers, the trusted component may hash the strings using a hash function, encrypt the hash using the unique key, and attach the encrypted hash—the digital signature—to the network configuration rules and software measurements, creating digitally signed response data.

Responsive to receiving digitally signed response data 216, the trust engine 230 may verify the source using a trusted third party (TTP), trusted certification authority (CA), or direct anonymous attestation (DAA) issuer. The trust engine 230 can verify not only the source of the network configurations and software measurements, but can also verify the integrity of the information. Source and integrity may be verified, for example, by decrypting the digital signature of response data using a public key that corresponds to the unique key, hashing the data to which the digital signature was attached, and comparing the second hash to the hash included in the digital signature. Matching hashes assures the identity of the network element is genuine—e.g., because the hash may only be obtained using the public key that corresponds to the network element's unique key—and that the response data has not been altered—e.g., because any alteration of the response data would change the hash, which would cause the hashes to not match properly.

A trusted component included in the trust engine 230 may be used, in a process similar to that described above, to provide digitally signed verification data 218 to the client device 210. The client device 210 may verify the digitally signed verification data 218 in a manner similar to that used by the trust engine 230 above, e.g., using a TTP and hash function to verify the identity of the trust engine 230 and the integrity of the verification data 218.

An SDN network, such as the cloud network 220, may be dynamically reconfigured by one or more SDN controllers, such as the SDN controller 240. As noted above, dynamic reconfiguration may be used for a number of reasons, such as load balancing purposes, responsive to network element crashes, or to meet new client requirements. Dynamic reconfiguration may result in changes to the back-end network 250, and the trust engine 230 can periodically monitor the back-end network 250 for changes. When changes are detected, the trust engine 230 may verify the changed portion, or re-verify the entire back-end network 250, and provide the client device 210 with updated verification data. In some implementations, the SDN controller 240 may be configured to notify the trust engine 230 when making changes to the back-end network 250, or to other network elements 260 of the cloud network 220.

By way of example, if network element E 255 crashes, the SDN controller 240 may assign a new network element, such as network element Z 260, to take the place of network element E 255. As network element Z 260 was not verified during the initial verification of the back-end network 250, the trust engine 230 may send network element Z 260 an attestation request 214 and, following a process similar to the one described above, provide attestation proof to the client device 210 for the new network element 250. In this manner, use of a trust engine in an SDN enables dynamic verification of the back-end networks of clients.

Figure 3:
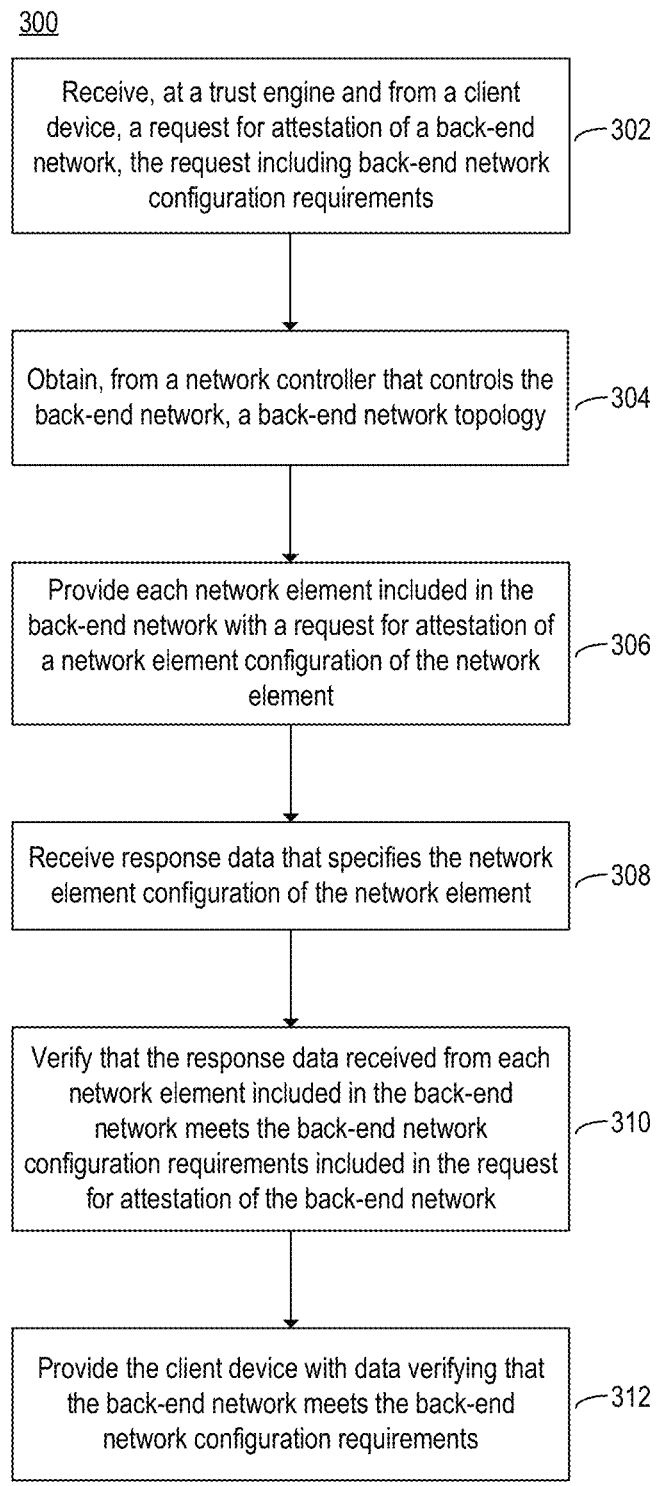
FIG. 3 is a flowchart of an example method for verifying network elements.

FIG. 3 is a flowchart of an example method 300 for verifying network elements. The method 300 may be performed by a computing device, such as a computing device described in FIG. 1A. Other computing devices may also be used to execute method 300. Method 300 may be implemented in the form of executable instructions stored on a machine-readable storage medium, such as the storage medium 130, and/or in the form of electronic circuitry.

A request for attestation of a back-end network is received, at a trust engine and from a client device (302). The request includes back-end network configuration requirements. For example, a client device may request that a trust engine provide attestation that network elements used to handle the client's network traffic are located in a particular country.

A back-end network topology is obtained from a network controller that controls the back-end network (304). For example, the trust engine may obtain, from a network controller, the identity of each network element used to handle the client's network traffic, e.g., the network elements of the back-end network, and the expected geographic locations of the network elements.

Each network element in the back-end network is provided with a request for attestation of a network element configuration of the network element (306). For example, the trust engine may request the geographic location of each network element included in the back-end network.

Response data is received that specifies the network element configuration of the network element (308). For example, each network element in the back-end network may provide the trust engine with its geographic location. In some implementations, the response data provided by each network element is digitally signed by the network element. For example, a trusted component of a network element cryptographically binds the network element configuration data to the identity of the network element when creating the response data.

Verification that the response data received from each network element included in the back-end network meets the back-end network configuration requirements included in the request for attestation of the back-end network is performed (310). For example, the trust engine may determine that the geographic location of each network element in the back-end network is within the particular country specified in the back-end network configuration requirements. In implementations where the response data is digitally signed by the individual network elements, the trust engine may also verify the source and integrity of the response data, e.g., using a trusted third party and a hash function, as described in further detail above.

Data verifying that the back-end network meets the back-end network configuration requirements is provided to the client device (312). For example, the trust engine may provide the client with data indicating that the client's network traffic on the back-end network is entirely within the particular country. In some implementations, the verification data provided by the trust engine is digitally signed by the trust engine. For example, a trusted component of the trust engine may cryptographically bind the data verifying the geographic location of the back-end network to the identity of the trust engine. The digitally signed verification data allows the client to verify both the source and integrity of the verification data, e.g., using a trusted third party and a hash function, as described in further detail above.

The foregoing disclosure describes a number of example implementations for verifying network elements. As detailed above, examples provide a mechanism for verifying that network elements, such as switches, routers, and servers operating in an SDN, are operating in a particular manner.

We claim:

1. A method comprising:
receiving, by a system comprising a hardware processor from a client device, a request for attestation of a back-end network, the request including a back-end network configuration requirement;
responsive to the request, obtaining, by the system from a network controller that controls the back-end network, a back-end network topology that specifies a plurality of network elements included in the back-end network, and links between the plurality of network elements;
sending, by the system to each respective network element of the plurality of network elements specified by the obtained back-end network topology, a request for attestation of a network element configuration of the respective network element;
receiving, by the system from each respective network element of the plurality of network elements responsive to the request for attestation of the network element configuration sent to the respective network element, response data that specifies the network element configuration of the respective network element, the network element configuration including data specifying links between the respective network element and other network elements, and including a port forwarding rule used by the respective network element to handle network traffic;
verifying, by the system, that the response data received from each network element included in the back-end network meets the back-end network configuration requirement included in the request for attestation of the back-end network; and
providing, by the system, the client device with data verifying that the back-end network meets the back-end network configuration requirement.

2. The method of claim 1, wherein the request for attestation of the back-end network includes a back-end software configuration requirement, and wherein the network element configuration received from each respective network element of the plurality of network elements includes network element software data.

3. The method of claim 1, wherein the system and the plurality of network elements are included in a software defined network controlled by the network controller.

4. The method of claim 1, further comprising:
receiving, at the system and from the client device, a request for attestation of the system; and
providing system attestation proof to the client device in response to the request for attestation of the system.

5. The method of claim 1, wherein the back-end network configuration requirement comprises a request for attestation of isolation of each network element included in the back-end network from network traffic of at least one other client device.

6. The method of claim 1, wherein the client device is associated with a first client, wherein the request for attestation of the back-end network comprises a request for attestation of isolation of each network element included in the back-end network from network traffic of a second client, and wherein the verifying comprises verifying that a communication of the network traffic of the second client through the back-end network is isolated from a communication of network traffic of the first client through the back-end network.

7. A non-transitory machine-readable storage medium comprising instructions that upon execution cause a computing device to:
receive, from a client device, a request for attestation of a back-end network, the request including a back-end configuration requirement relating to isolation of network traffic of a first client;
obtain, from a network controller that controls the back-end network, a controller configuration that specifies a plurality of network elements for communicating data of the first client in the back-end network;

send, to each respective network element of the plurality of network elements specified by the controller configuration, a request for attestation of a network element configuration of the respective network element;

receive, from each respective network element of the plurality of network elements, response data that specifies the network element configuration of the respective network element, wherein the network element configuration received from the respective network element includes data specifying links between the respective network element and other network elements;

verify that the response data received from each network element of the plurality of network elements meets the back-end configuration requirement, wherein the verifying comprises verifying that the network traffic of the first client communicated through the back-end network is isolated from network traffic of a second client communicated through the back-end network; and providing the client device with data verifying that the back-end network meets the back-end configuration requirement.

8. The non-transitory machine-readable storage medium of claim 7, wherein the instructions upon execution further cause the computing device to:

generate obfuscated response data based on the response data received from each network element of the plurality of network elements, and wherein the data verifying that the back-end network meets the back-end configuration requirement includes the obfuscated response data.

9. The non-transitory machine-readable storage medium of claim 8, wherein:

the back-end configuration requirement further specifies a first version of a software application;

the network element configuration received from a given network element of the plurality of network elements specifies that the given network element is running a second version of the software application, the second version being different from the first version; and the data verifying that the back-end network meets the back-end configuration requirement specifies that each network element included in the back-end network is running the first version of the software application.

10. The non-transitory machine-readable storage medium of claim 7, wherein the network element configuration received from each respective network element of the plurality of network elements comprises a port forwarding rule used by the respective network element to forward network traffic through the back-end network.

11. A computing device comprising:
a hardware processor; and
a non-transitory storage medium storing instructions that, when executed by the hardware processor, cause the hardware processor to:

receive, from a client device, a request for attestation of a back-end network, the request including a back-end configuration requirement;

responsive to the request, obtain, from a network controller that controls the back-end network, a back-end network topology that specifies a plurality of network elements included in the back-end network, and links between the plurality of network elements;

after the obtaining of the back-end network topology, send, to each respective network element of the plurality of network elements specified by the obtained back-end network topology, a request for attestation of a network element configuration of the respective network element;

receive, from each respective network element of the plurality of network elements, response data that specifies the network element configuration of the respective network element, wherein the network element configuration received from the respective network element includes data specifying links between the respective network element and other network elements, and includes a port forwarding rule used by the respective network element to forward network traffic in the back-end network;

verify that the response data received from each network element meets the back-end configuration requirement included in the request for attestation of the back-end network; and provide the client device with data verifying that the back-end network meets the back-end configuration requirement.

12. The computing device of claim 11, wherein the verifying comprises verifying that the plurality of network elements use a particular type of encryption on data.

13. The computing device of claim 11, wherein the plurality of network elements comprises routers or switches.

14. The computing device of claim 11, wherein the instructions further cause the hardware processor to:

generate obfuscated response data based on the response data received from each network element of the plurality of network elements, and wherein the data verifying that the back-end network meets the back-end configuration requirement includes the obfuscated response data.

15. The computing device of claim 14, wherein the obfuscated response data is generated by reducing a granularity of at least one measurement included in the network element configurations received from the plurality of network elements.

16. The computing device of claim 11, wherein the back-end configuration requirement includes a back-end network configuration requirement and a back-end software configuration requirement, and wherein the verifying comprises verifying that each network element of the plurality of network elements runs a software version that satisfies the back-end software configuration requirement.

17. The computing device of claim 11, wherein the back-end network and the computing device are included in a software defined network controlled by the network controller.

18. The computing device of claim 11, wherein the instructions further cause the hardware processor to:

receive, from the client device, a request for attestation of the computing device; and provide computing device attestation proof to the client device in response to the request for attestation of the computing device.

19. The computing device of claim 11, wherein the client device is associated with a first client, wherein the request for attestation of the back-end network comprises a request for attestation of isolation of each network element included in the back-end network from network traffic of a second client, wherein the verifying comprises verifying that a communication of the network traffic of the second client through the back-end network is isolated from a communication of network traffic of the first client through the back-end network.

20. The computing device of claim 19, wherein the verifying that the communication of the network traffic of the second client through the back-end network is isolated from the communication of the network traffic of the first client through the back-end network comprises obtaining a network configuration of the second client from the network controller.

\* \* \* \* \*